(12) United States Patent
Tendick (10) Patent No.: US 11,586,954 B2
(45) Date of Patent: Feb. 21, 2023

(54) PREDICTIVE ANALYTICS AND SERVICES

(71) Applicant: Avaya Inc., Santa Clara, CA (US)

(72) Inventor: Patrick Tendick, Basking Ridge, NJ (US)

(73) Assignee: Avaya, Inc, Santa Clara, CA (US)

( * ) Notice: Subject to any disclaimer, the term of this patent is extended or adjusted under 35 U.S.C. 154(b) by 2044 days.

(21) Appl. No.: 15/139,979

(22) Filed: Apr. 27, 2016

(65) Prior Publication Data

US 2017/0249557 A1    Aug. 31, 2017

Related U.S. Application Data

(60) Provisional application No. 62/300,589, filed on Feb. 26, 2016.

(51) Int. Cl.
    *G06N 5/04*     (2006.01)
    *G06N 5/043*    (2023.01)
(52) U.S. Cl.
    CPC .................... *G06N 5/043* (2013.01)
(58) Field of Classification Search
    CPC ..................................................... G06N 5/043
    See application file for complete search history.

(56) References Cited

U.S. PATENT DOCUMENTS

| | | | | |
|---|---|---|---|---|
| 9,020,873 | B1 * | 4/2015 | Duffy ................... | G06F 9/4498 706/46 |
| 2003/0229884 | A1 * | 12/2003 | Carr ...................... | G06F 16/217 717/101 |
| 2009/0320073 | A1 * | 12/2009 | Reisman ............... | G06F 16/954 725/51 |
| 2011/0161076 | A1 * | 6/2011 | Davis .................... | G06F 3/0488 704/231 |
| 2014/0088952 | A1 * | 3/2014 | Fife ..................... | H04N 21/4667 704/9 |
| 2015/0269580 | A1 * | 9/2015 | Subramanian ..... | G06Q 20/4016 705/44 |

* cited by examiner

*Primary Examiner* — Tsu-Chang Lee (57) ABSTRACT

A device, system, and method use predictive analytics based on an application-centric approach. The method includes receiving a request from an interactive application interacting with a user utilizing a user device for action data indicating an action to be taken by the interactive application during a session with the user device, the request generated by the interactive application based on a decision point associated with the interactive application. The method includes receiving from the interactive application session data associated with the session and the user device. The method includes determining scoring package data associated with the request based on the session data, the scoring package data comprising a predictive model indicative of a plurality of actions to be performed by the interactive application. The method includes generating the action data based on the scoring package data and transmitting the action data to the interactive application.

20 Claims, 5 Drawing Sheets

PREDICTIVE ANALYTICS AND SERVICES

PRIORITY CLAIM/INCORPORATION BY REFERENCE

This application claims priority to U.S. Provisional Application 62/300,589 entitled "Device and Method for Predictive Analytics and Services," filed on Feb. 26, 2016, the entirety of which is incorporated herein by reference.

BACKGROUND

A user device utilized by a user may execute a plurality of applications by using a plurality of different components that provide a plurality of different functionalities and features. A specific type of the applications that are executed on the user device may be interactive applications in which a user interacts with an automated response device (e.g., associated with a server of a website). For example, the interactive applications may be a web application, a mobile application, a web chat application, an interactive voice response (IVR) application, etc. Due to the automated nature with respect to the provider of the interactive application, the interactive applications may be configured to be used in a variety of ways by the provider. For example, the provider may utilize predictive analytics to predict what a user may want, may need, will buy, will pay, will do, etc. The predictive analytics may improve an experience for the customer as well as increase revenues and reduce costs for the provider.

Incorporating predictive analytics into an interactive application involves two highly specialized and very different roles: the analyst and the developer. The analyst understands how to analyze data and develop predictors such that a predicted action may be recommended. The developer understands what the interactive application should do and how to implement it. Conventional predictive analytics utilizes an analyst-centric approach. Specifically, the analyst may develop a model of purchasing behavior using various sources of data. However, with an analyst-centric approach, the development of the model revolves around necessities of the analyst (e.g., requesting information every 5 seconds to determine if a recommendation should be made). However, the developer may be incapable of accommodating the analyst (e.g., cannot provide a response to the request as information is only available from reactions registered from the customer). Furthermore, it may not be clear to the analyst exactly what information can be known at a particular point in time. Even if all required information is provided to the analyst, ultimately, a result used in creating the model or from using the model may be generated. However, the developer may be unequipped to utilize this result properly.

BRIEF SUMMARY

The exemplary embodiments are directed to a method comprising: receiving, by a broker device, a request for action data from an interactive application interacting with a user utilizing a user device, the action data indicative of an action to be taken by the interactive application during a session with the user device, the request generated by the interactive application based on a decision point associated with the interactive application; receiving, by the broker device, session data from the interactive application, the session data associated with the session and the user device; determining, by the broker device, scoring package data associated with the request based on the session data, the scoring package data comprising a predictive model indicative of a plurality of actions to be performed by the interactive application; generating, by the broker device, the action data based on the scoring package data; and transmitting, by the broker device, the action data to the interactive application.

DETAILED DESCRIPTION

The exemplary embodiments may be further understood with reference to the following description and the related appended drawings, wherein like elements are provided with the same reference numerals. The exemplary embodiments are related to a device, a system, and a method for utilizing predictive analytics and services by a broker device associated with a provider of an interactive application that interacts with a user device utilized by a user. The exemplary embodiments provide operations in which the perspective to determine the predictive analytics and services is based upon an application-level intelligence. That is, the exemplary embodiments are based upon an application-centric approach. Specifically, the exemplary embodiments provide a dynamic mechanism in an online manner where a model provides a score used to determine a predictive service with the interactive application identifying decisions that are to be made in processing a transaction.

The exemplary embodiments provide an application-centric approach to predictive analytics and services. Specifically, the exemplary embodiments relate to a framework of adding intelligence capabilities to applications to facilitate building new decision-enabled applications. By modifying the application to be configured to request an action or recommendation to be performed at various decision points during a session, the application-centric approach may be achieved. The application may generate information directed to the application-centric approach which is used by a broker device in determining the action or recommendation to be taken. Through experimentation and updating with how sessions are performed, an application-centric model may be created in handling subsequent sessions such that subsequent actions or recommendations may be determined. Therefore, the exemplary embodiments enable a developer and an analyst to fully exploit capabilities associated with each in creating the predictive analytics and services to be used with interactive applications. The framework, according to the exemplary embodiments, provides a synthesis of the efforts of the developer and the analyst in an efficient and transparent way. Specifically, analytic capabilities (e.g., analysis of operational data) are better handled in the decision-making operation without complicating the mechanics of how the application operates.

In a particular example, the interactive application may be related to an e-commerce website where a customer may view and purchase different products for delivery. When the customer views a specific product by requesting a web page from the website, it may be assumed that the customer is interested in that product. An associated cost with purchasing the product on the e-commerce website is a delivery cost which may be incurred on the provider of the e-commerce website or the customer. If an incentive is needed for the customer to purchase the product, an offer may be included such as free shipping such that the delivery cost is shifted from the customer to the provider. However, removing shipping costs for the customer reduces a profit margin of the provider. According to the exemplary embodiments, the website may utilize predictive analytics to determine whether the offer of free delivery is necessary to increase a likelihood that the customer will purchase the product or whether the delivery cost may remain with the customer, thereby maximizing the customer experience and provider maximized revenues for each purchase session.

Those skilled in the art will understand that the theory of utilizing predictive analytics to be apparent. However, the reduction to practice of incorporating predictive analytics, especially in an automated manner, poses many challenges. With an analyst-centric approach being used in conventional uses of predictive analytics, a disconnect is created between the analyst and the developer where the analyst assumes the existence of information that the interactive application may not be able to provide, and results produced by the analyst (e.g., the model) may provide important information that may be unusable by the interactive application produced by the developer. Thus, the exemplary embodiments provide a manner of incorporating predictive analytics to an interactive application where an application-centric approach is used.

It is noted that the exemplary embodiments are described with respect to an e-commerce website being the interactive application having the predictive analytics incorporated therewith. However, the use of the e-commerce website is only exemplary. Those skilled in the art will appreciate that the exemplary embodiments may be modified for incorporation with any scenario where predictive analytics may be used. For example, the scenario may be with any type of website where a user using a user device communicates with another device. In another example, the scenario does not necessarily require a website such as with another user via any communication channel (e.g., voice application where the other user receives recommended actions via the predictive analytics). In a further example, the scenario does not necessarily require a purchasing arrangement such as with information requests or resolving an issue associated with an account. Accordingly the e-commerce website used herewith maybe representative of every scenario where the predictive analytics according to the exemplary embodiments maybe used.

It is also noted that the exchange between the user device utilized by the user and the e-commerce website (along with any devices that the user device has communicated with prior and subsequent) is described herein as a session. The session may therefore be from an initial contact by the user device until a resolution of the purchase attempt. Those skilled in the art will understand that there may be a plurality of interactive applications that may be involved in a single session. Far example, a first application may start, subsequently control being transferred to a second application, then the second application ending followed by the first application ending. Thus, the session may encompass these applications. Furthermore, the exemplary embodiments are described herein with respect to a contact center which is associated with the e-commerce website. Thus, as will be described in further detail below, operations performed with the e-commerce website may also entail operations performed by the contact center and associated devices.

Figure 1:
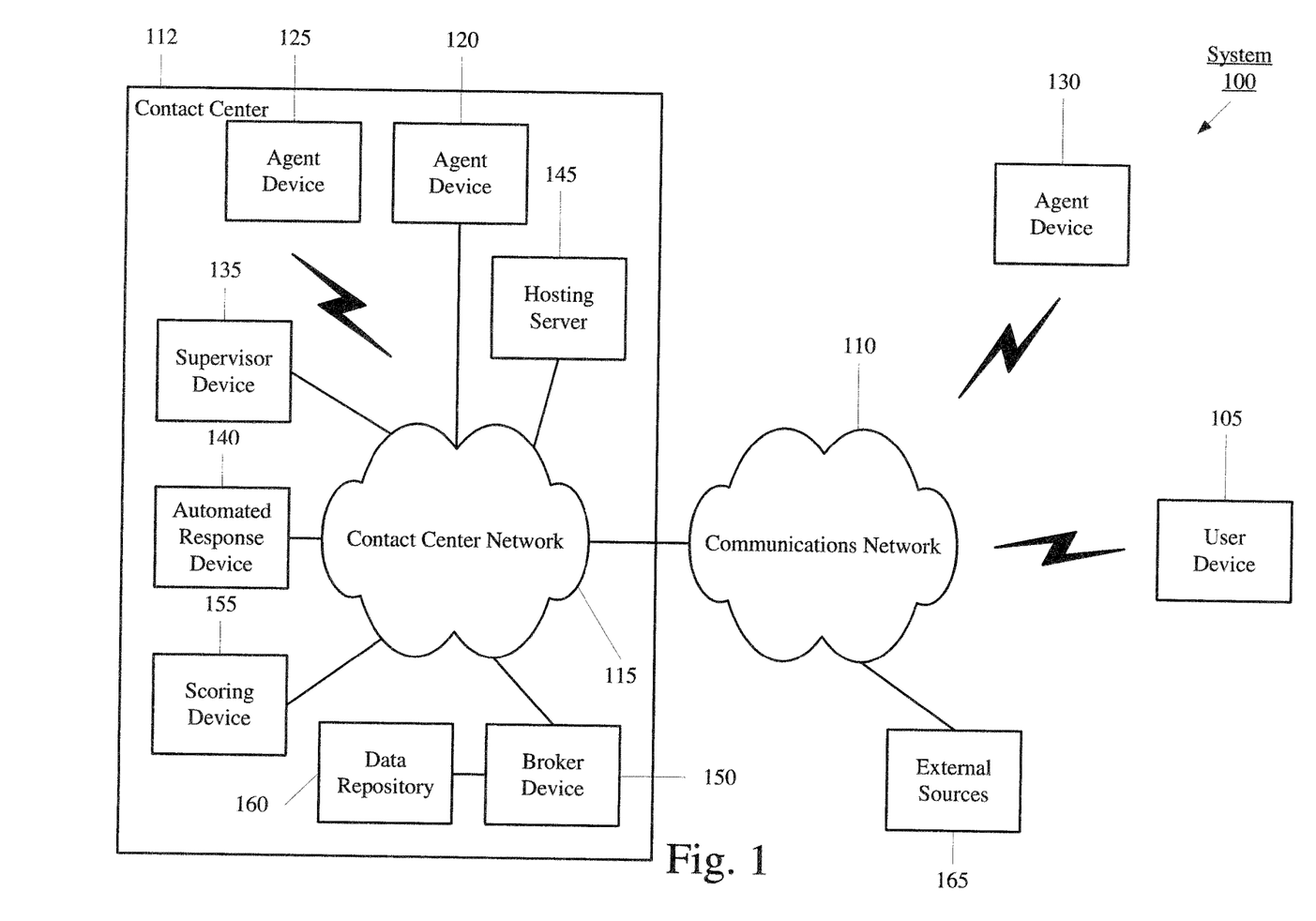
FIG. 1 shows an exemplary contact center system according to the present disclosure.

FIG. 1 shows an exemplary embodiment of a system 100 including a contact center 112 and channels for a user to communicate with the contact center 112 according to the present disclosure. The system 100 may include a communications network 110 and a contact center communications network 115 which are communicatively connected to one another. Accordingly, a user device 105 connected to the communications network 110 may communicate with the contact center 112. The system 100 may enable the user device 105 utilized by a user to perform a transaction via the communications network 110 and the contact center network 115 to a resource of the contact center 112 so that a communication channel may be established therebetween in real-time or non-real-time for the transaction to be processed. That is, the transaction may relate to an inbound transaction originating from the user device 105 or an outbound transaction originating from the contact center 112. The resources of the contact center 112 may include a plurality of agent devices 120-130, a supervisor device 135, and an automated response device 140. Accordingly, the agent devices 120-130 and the supervisor device 135 may represent manually operated resources whereas the automated response device 140 may represent an automated resource. As will be described in further detail below, the system 100 may further include an e-commerce component which may be represented as a website as hosted by a hosting server 145 and a predictive services component which may be provided by a broker device 150 cooperating with a scoring device 155.

The user device 105 may enable a user to perform a session with the contact center 112. Specifically, the user device 105 may establish a connection to the communications network 110 via a wireless connection or with a wired connection which is connected to the contact center network 115. Accordingly, the user device 105 may establish a connection with the contact center 112 to perform the session. The user device 105 may represent any electronic device that is configured to perform the functionalities described herein. For example, the user device 105 may be a portable device such as a tablet, a smartphone, a laptop, etc. In another example, the user device 105 may be a client stationary device such as a desktop terminal. The user device 105 may include the necessary software, hardware, and/or firmware required to perform the processing of the transaction using the various channels available to the user device 105.

The channels in which to perform the session may include real-time and non-real-time communication channels. For example, the real-time communication channels may be a voice only channel, a video channel, a text channel, etc. The non-real-time communication channels may be an email channel, a Web form channel, a website/web page channel, etc. Accordingly, if the user device 105 includes, for example, a microphone and a speaker, the voice only channel may be used. However, it is noted that the channels available to the user device 105 may be limited by the capabilities of the contact center 112 and vice versa or alternatively based on user preference. Thus, if the user device 105 is configured to perform all the non-real-time communication channels and only the voice only channel and the contact center 112 is configured for all communication channels, the user device 105 may process the transaction with the contact center 112 using a real-time communication channel via the voice only channel. If the user device 105 is configured for all communication channels and the contact center 112 is configured for only non-real-time communication channels such as via the website, the user device 105 may be limited to only the non-real-time communication channels.

The communications network 110 may represent any single or plurality of networks used by the user device 105 to communicate with the contact center 112 via the contact center network 115. For example, if the user device 105 is a personal home computer, the communications network 110 may include a home network in which the user device 105 may initially connect. The home network may connect to a network of an Internet service provider to connect to the Internet. Subsequently, through the Internet, a connection may be established with the contact center network 115. It should be noted that the communications network 110 and all networks that may be included therein may be any type of network. For example, the communications network 110 may be a local area network (LAN), a wide area network (WAN), a virtual LAN (VLAN), a WiFi network, a HotSpot, a cellular network (e.g., 3G, 4G, Long Term Evolution (LTE), etc.), a cloud network, a wired form of these networks, a wireless form of these networks, a combined wired/wireless form of these networks, etc. The communications network 110 may also represent one or more networks that are configured to connect to one another to enable the data to be exchanged among the components of the system 100.

The contact center network 115 of the contact center 112 may enable a plurality of devices to be interconnected with one another, in particular the resources of the contact center 112. For example, the contact center network 115 may be a proprietary network accessible in one manner by the agent devices 120-130, the supervisor device 135, the automated response device 140, and the action model device 145. Specifically, the agent devices 120-130, the supervisor device 135, the automated response device 140, and the action model device 145 may be connected to the contact center network 115 via an authorized or privileged connection for select information and data to be accessed. However, as discussed above, the contact center network 115 may be accessed in another manner via the communications network 110 by the user device 105. This connection may enable communications to be transmitted and/or received between the end devices without access to the above noted information and data, particularly using the video communication.

The contact center network 115 may also enable direct connections thereto using, for example, both wired and wireless connections. Specifically, the agent device 120 may utilize a wired connection to establish the connection with the contact center network 115. The agent device 125 may utilize a wireless connection to establish the connection with the contact center network 115. Furthermore, the agent device 120 and the agent device 125 may be within a predetermined proximity of the contact center network 115 in order to establish the connection. Using an authorization procedure (e.g., login and password), the connection for the agent devices 120, 125 may be established. In addition, the contact center network 115 may enable remote connections thereto using, for example, the communications network 110. For example, an agent may work remotely from a location that is outside the proximity of the contact center network 115 such as the agent device 130. Using authentication, authorization, and accounting (AAA) procedures (via a AAA server), the agent device 130 may establish a connection with the contact center network 115 in a substantially similar manner as the agent devices 120, 125.

In view of the above description of the contact center network 115, it should be noted that the contact center network 115 may include a variety of components (not shown) to enable these functionalities. For example, the contact center network 115 may include a server, a router, a switch center, a network management arrangement, a database, etc. It should also be noted that the use of three agent devices 120-130 is only exemplary. Those skilled in the art will understand that the contact center may utilize any number of agent devices. It should further be noted that the use of one supervisor device 135 is only exemplary. Those skilled in the art will understand that the contact center may utilize any number of supervisor devices to manage one or more agent devices.

The different components used by users of the contact center 112 may include the agent devices 120-130 and the supervisor device 135. The agent devices 120-130 may be utilized by respective agents to perform a portion of the session. Specifically, the session may transition from the user interacting with the website to speaking to an agent to resolve a purchasing issue. In a substantially similar manner as the user device 105, the agent devices 120-130 may be configured to perform the session using the one or more channels as defined by the contact center 112. The agent may subsequently use a process to determine a response or resolution for an issue associated with the session.

The supervisor device 135 may be utilized by a supervisor who is responsible for a plurality of agents such as those using the agent devices 120-130. The supervisor may be configured to monitor the actions performed by the agents. The supervisor may notate along the monitoring process (e.g., notes related to a performance of the agent, notes related to a user reaction, etc.). In this manner, the supervisor may provide an indirect involvement with the session. When required, the supervisor may also participate in the performing of a session. For example, the session may require a special authorization that the agent is not enabled to provide and only the supervisor may provide. In another example, the session may require a supervisor intervention such as when the user becomes dissatisfied with the agent. In this manner, the supervisor may provide a direct involvement with the transaction.

The automated response device 140 may be a component of the contact center 112 that automatically generates an interaction in performing a session with the user of the user device 105. The automated response device 140 may also use the various channels that the contact center 112 is configured to use. For example, the automated response device 140 may utilize a voice only channel when the user device 105 establishes a connection with the contact center 112 using the voice only channel. In another example, the automated response device may utilize an email channel when the user device 105 transmits an email request or a Web form.

As noted above, the contact center 112 may also include the hosting server 145. The hosting server 145 may be configured to provide the website over the communications network 110. Thus, any user device connected to the communications network 110 (e.g., the Internet) may access the website and utilize the services and features provided thereby. Therefore, the hosting server 145 may include all hardware, software, and firmware to perform the functionalities of creating the website, providing the website, and performing all associated operations in running the website. For example, with the website being an e-commerce website, the hosting server 145 may provide the website, receive an order to purchase an item, and forward the order to the appropriate department to complete the purchase (e.g., delivery of the product, processing the payment, etc.). As an e-commerce website, the contact center 112 may be associated with an entity operating the e-commerce website in which the contact center 112 may represent a contacting entity for users to contact if regarding an aspect outside the operations of the website itself.

The website hosted by the hosting server 145 may also represent an interactive application. As an e-commerce website, the interactive aspect may be represented by the user entering inputs to purchase items. Those skilled in the art will understand that interactive applications may be any application in which inputs from users are accepted for operations to be performed by the application. There are many different types of interactive applications in which a user may interact. As noted, the website hosted by the hosting server 145 may be an interactive application (e.g., an e-commerce application). Further examples of interactive applications may be any application in which a user may interact with an automated response device (e.g., the automated response device 140) such as a mobile application, a web chat application, an interactive voice response (IVR) application, etc.

As interactive applications such as the e-commerce website are being used more prevalently, the increasing volume of available data associated with use of the interactive applications may be applied to altering the behavior of the interactive applications in real time. As described above, the exemplary embodiments do not utilize traditional data analysis and learning methods which are inherently an offline process, making decisions in real time fundamentally different. Although scoring or decisioning engines have still been developed to apply fitted models or classifiers to new data in a relatively short period of time, traditional approaches utilize an analyst-centric approach. However, the exemplary embodiments utilize an application-centric approach as interactive applications are event driven. That is, decision points or events where predictive analytics may be useful for the interactive application are at unpredictable times and in an unpredictable order as these are dependent on how and when the user chooses to interact with the interactive application. Therefore, using an analyst-centric approach as is used conventionally considers predictive analytics outside the context of the interactive application where a model producing a prediction or score must be adapted to the interactive application. However, one skilled in the art will appreciate that the difficulty lying in this approach as the direction from analyst to application generally does not address the range of decisions made by the interactive application nor leverage the data that is available to the interactive application in real time. Thus, with the hosting server 145 hosting an e-commerce website which is an interactive application, the exemplary embodiments utilize the application-centric approach in which the interactive application requests a decision that is meaningful to the logic of the interactive application.

It should be noted that the interactive application may be used by the user of the user device 105 in a variety of different locations. For example, the user device 105 may receive a data package to install the interactive application for execution thereon. When executed, the interactive application may be used on the user device 105. In another example, the hosting server 145 may receive requests to render the interactive application on the user device 105. Thus, the user device 105 may execute an application already installed thereon (e.g., a web browser) for the interactive application to be run.

It should also be noted that the hosting server 145 providing the website is only exemplary. Those skilled in the art will understand that the organization associated with the contact center 112 may utilize third party services to provide the website. The hosting server 145 may be used as a device communicating with the third party services. For example, orders from users may be communicated from the third party services to the hosting server 145. In another example, the third party services may forward a request from a user who wishes to contact the contact center 112.

To perform the application-centric approach of incorporating predictive analytics, the contact center 112 may further include the broker device 150 and the scoring device 155. As those skilled in the art will understand, the principle of evidence based design indicates that empirical observations may be used to guide application implementation. For example, A/B testing may be used to select between two or more available options. In a particular example, the selection may be for interface design elements of the website based on random assignment of candidate designs to users as the website is requested, the results being used to select the design that has the optimal expected outcome (e.g., click through rates or conversions). Although the above example of interface elements using evidence based design and A/B testing is associated with a static change in the interface application logic or content, the exemplary embodiments may utilize the data to guide how the interactive application reacts or makes decisions in real time in a dynamic manner.

A particular scenario in which the exemplary embodiments may be applied is a "next best action" scenario where predictive models or machine learning is used to select the best action to take at the current instant given all of the information currently available. For example, the automated response device 140 of the contact center 112 may include the IVR application that makes decisions about whether to continue asking a user questions or simply route the user to an agent based on all of the inputs the user has provided so far. Such a decision may be based on a decision rule that attempts to balance transaction outcome (e.g., successful handling of the transaction) against the cost of having the agent decide how to route the transaction.

A particular type of scenario in the "next best action" scenario is the "next best offer" scenario which is a special case that seeks the best product or service to offer a user based on all of the information known at the moment. Such a scenario may be particularly appropriate with the e-commerce website. For example, the e-commerce website may be a travel website where the user is attempting to book an airline flight. The website may offer travel insurance or an upgrade depending on information the website has gathered from the user previously (e.g., in previous sessions) and inputs the customer has made while selecting the flight (e.g., during the current session). For example, the offers may be complimentary to add incentive for the user to purchase a ticket.

As predictive models or machine learning algorithms (referred to herein collectively as "predictive models") are used in predictive analytics, scoring engines may be utilized that represent server applications evaluating the predictive models on new observations (i.e., available information). It is noted that one skilled in the art will understand the predictive models to be models that leverage statistics to predict outcomes. The scoring engines may operate with high efficiency having the capability of returning results for a single new observation in real time (e.g., with a latency measuring in milliseconds). The scoring engines may be configured to provide a numeric or quantitative output (e.g., a percentage, a ratio, etc.) that estimates a propensity for a certain result to occur (e.g., whether a user is likely to default on a loan). The scoring engines may also be configured to provide a qualitative output corresponding to recommended decisions (e.g., whether to offer a certain type of insurance policy to a user). Decisioning engines may also be utilized in predictive analytics that are specifically intended to render business decisions using, for example, business rules. For example, the decision to offer a home loan to a user requesting the home loan involves business rules that describe lending policies (e.g., credit score minimum criteria). The decisioning engines may also evaluate statistical models or execute other processes in providing a decision. It is noted that one skilled in the art will understand the statistical models to be models that embody a set of assumptions related to the generation of observed data. For illustrative purposes, scoring engines and decisioning engines will be referred herein collectively as scoring engines. As the scoring engines utilize external tools to obtain the models or decision rules, the term "scoring framework" is used herein to refer to the scoring engine along with any tools used in conjunction therewith. With reference to the system 100 of FIG. 1, the scoring device 155 may represent the scoring framework that is used with the broker device 150.

With the scoring device 155 providing the scoring engine and the scoring framework and generating outputs, the information from the scoring device 155 may be provided to the broker device 150 to provide the predictive analytics for requests received from the interactive application. As described above, data driven methods for predictive analytics involve two disparate roles of an analyst (i.e., a data scientist) and an application developer. The analyst collects data, analyzes the data, and fits models or performs other types of learning to the data. The analyst attempts to make predictions based on predictors which are known attributes of the user or interaction that may be shown to predict outcomes. The application developer is responsible for delivering and maintaining a working operational system (i.e., creating and maintaining the interactive application). With different skill sets being required in these roles, the differences present challenges for successful implementation of data driven decisions in interactive applications.

In further identifying the differences in skill sets, the analyst must perform a first set of operations. In a first example, the analyst must collect data on outcomes (e.g., aspects to be predicted such as whether a user purchases an item) and predictors (e.g., variables used to predict the outcome such as user demographics, products viewed, purchase history, etc.). In a second example, the analyst must understand how the interactive application operates and how the data relates to the interactive application as well as identify decisions that the interactive application makes or could make. In a third example, the analyst must synchronize the predictors with the decisions (e.g., specify what data is known at the point in time that a prediction should be made). In a fourth example, the analyst must extract data sets for analysis.

However, analysts typically rely on data obtained offline through batch processing to train predictive methods. Therefore, efforts to use predictive methods to make decisions in interactive applications do not incorporate data that is obtained from the interactive application in real time because the data is not available to the analyst offline or because the data that can be obtained offline cannot be captured in real time (even if that data has changed). Furthermore, interactive applications are event driven. That is, the interactive application consists of a collection of event handlers that respond to the user inputs. Accordingly, there is a lower probability that the interactive application behaves in predictable ways since the interactive application is responding to unpredictable inputs from the user.

In this regard, the application developer must also perform a second set of operations. In a first example, the application developer must know what predictors to capture and capture these predictors. In a second example, the application developer must modify the interactive application to make predictions for the decision points. In a third example, the application developer must understand what is being predicted and relate the predictions to possible actions.

As described above, conventional approaches utilize an analyst or decision-centric approach where the analyst uses scoring frameworks with a specific prediction problem or decision that is predetermined. The interactive application must then conform to the interface for the appropriate scoring engine and decide how to incorporate the output of the scoring engine into the processing. Thus, the exemplary embodiments provide a mechanism utilizing an application-centric approach in which the interactive application identifies the decisions that must be made and then queries the broker device 150 to provide the decision (i.e., request an action or decision and receive a response accordingly).

The decision framework upon which the exemplary embodiments operate utilize various components. In a first example, the interactive application (which may be one or more applications) makes a decision at decision points which are specific locations in the interactive application operation at which the decisions are to be made (e.g., the e-commerce website may need to make a Boolean decision as to whether free shipping should be offered to a user). In a second example, a decision application programming interface (API) may be called by the interactive application at the decision points (e.g., the e-commerce website may call an API to obtain the Boolean decision). In a third example, the decision broker or the broker device 150 may be an intermediary between the interactive application and the scoring device 155. Specifically, the interactive application may make a decision by calling the appropriate API which makes a call (e.g., a decision or action request) to the broker device 150 which calls the scoring device 155 and passes the results back to the interactive application through the API. The broker device 150 will be described in further detail below. In a fourth example, the scoring device 155 may be invoked by the broker device 150. In a fifth example, a data store or the data repository 160 may store decision requests and responses along with other data for further analysis for the broker device 155. In a sixth example, external sources 165 may be databases, data repositories, data warehouses, transaction processing systems, message streams, etc. that include data relevant to the decision making process, particularly to the current decision.

Figure 2:
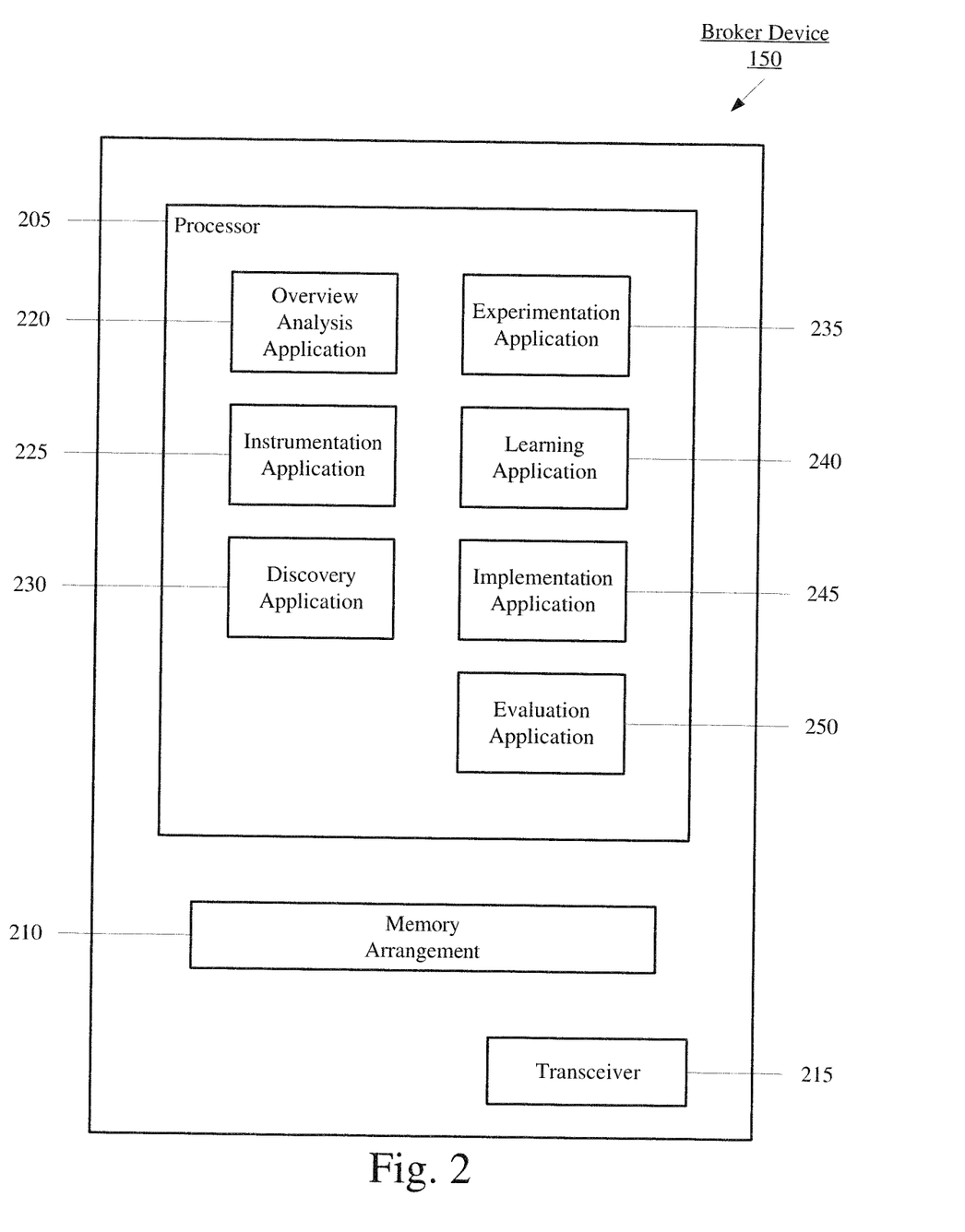
FIG. 2 shows an exemplary broker device of the system of FIG. 1 according to the present disclosure.

FIG. 2 shows the exemplary broker device 150 of the contact center 112 in the system 100 of FIG. 1 according to the present disclosure. As described above, the broker device 150 may be an intermediary between the interactive application utilized by the user device 105 and the scoring device 155 to determine decisions/actions to be performed for requests for decisions/actions from the interactive application. The decisions/actions may be of any type (e.g., Boolean, numeric or string valued, universal resource locator (URL) or object valued, etc.). Thus, the decisions/actions provided to the interactive application may represent a yes/no decision, the index of a choice from a list, a list of options to offer the user, HyperText Markup Language (HTML) links, content to display, etc. Accordingly, the broker device 150 may receive data associated with the session being performed by the interactive application. As will be described in further detail below, the exemplary embodiments may be configured for a first aspect relating to the development of the predictive services performed by the broker device 150 and a second aspect of the relating to the implementation of the predictive analytics and services with regard to a particular session with an interactive application with a user device.

The broker device 150 may represent any electronic device that is configured to perform the functionalities described herein. As shown in FIG. 2, the broker device 150 may include a processor 205, a memory arrangement 210, and a transceiver 215. The processor 205 may execute a plurality of applications, the memory arrangement 210 may store data related to the applications, and the transceiver 215 may establish a connection to the contact center network 115. It should be noted that the broker device 150 may also include further components such as a display device and an I/O device that enable an administrator to configure the broker device 150 to perform its intended functionalities. However, it should also be noted that the broker device 150 may be configured to receive these instructions via the transceiver 215 to automatically implement the policies upon reception.

The processor 205 may execute a plurality of applications. Specifically, the processor 205 may execute an overview analysis application 220, an instrumentation application 225, a discovery application 230, an experimentation application 235, a learning application 240, an implementation application 245, and an evaluation application 250. The overview analysis application 220 may provide a functionality to obtain an understanding of the interactive application and decisions that the interactive application may be configured to perform (e.g., with an e-commerce website, the interactive application may offer free shipping as an incentive). The instrumentation application 225 may provide a functionality that makes modifications to the interactive application to capture session data and incorporate decisions based on input from the overview analysis application 220. The discovery application 230 may provide a functionality to, based on an action/decision request submitted by the interactive application, discover the interactive application and decisions that the interactive application has made along with the data that was captured using the instrumentation application 225. The experimentation application 235 may provide a functionality to use the data from the overview analysis application 220 and the discovery application 230 to devise experiment data to be used in obtaining data for further analysis. The learning application 240 may provide a functionality to identify variables associated with the decision request from the interactive application including predictor variables and outcome variables. The learning application 240 may further extract datasets to fit models, train classifiers, or obtain decision rules in formatting a scoring framework, the scoring framework referring to the scoring device 155 and other components used therewith. The implementation application 245 may provide a functionality in constructing a scoring package to be used by the scoring device 155 in generating a score value for data from the learning application 240. The implementation application 245 also tests and deploys the scoring package. The above applications 220-245 may be used continuously such that the evaluation application 250 may provide a function-ality of generating result data to provide feedback data to the experimentation application 235 and the learning application 240.

The above process may utilize the experimentation application 235 in which substantially random or predetermined actions are to be performed by the interactive application to obtain the analysis data. That is, a particular action given a particular set of circumstances may have a given result which is recorded. This experimental phase may be utilized to generate a significant data set in which to create the scoring packages by the learning application 240.

The above process may also enable the broker device 150 to create scoring packages for use by the scoring device 155. The broker device 150 may thereby receive an action/decision request from the interactive application of the user device 105. The broker device 150 may utilize the action/decision request and a corresponding score value determined by the scoring device 155 associated with the various scoring packages to determine a recommended action to be taken by the interactive application.

The applications 220-250 may be used in various different manners and orders. For example, the applications 220-250 may be executed in sequential order (e.g., a waterfall model) or used in a more incremental or agile approach. The analyst component in the predictive analytics may also vary. For example, the analyst in the overview analysis application 220 may be different from the analyst in the learning application 240 or the evaluation application 250. It is noted that each application 220-250 only involves one of the roles (i.e., analyst or application developer) where the applications 220-250 are only loosely coupled. That is, execution of one of these applications 220-250 does not required detailed knowledge of what was done in previous applications 220-250. For example, in the implementation application 245, the application developer may choose to instrument the decisions identified in the overview analysis application 220 or may instrument different decisions instead. Nevertheless, the decisions are discovered by the discovery application 230. Therefore, the exemplary embodiments are configured to resolve one of the issues of incorporating predictive analytics to interactive applications where a particular functionality does not map to system implementation in a straightforward manner.

It should be noted that the above noted applications each being an application (e.g., a program) executed by the processor 205 is only exemplary. The functionality associated with the applications may also be represented as components of one or more multifunctional programs, a separate incorporated component of the user device 105 or may be a modular component coupled to the user device 110, e.g., an integrated circuit with or without firmware.

Using the above applications 220-250, the broker device 150 may be configured to receive a request for an action/decision from the interactive application (e.g., an e-commerce website hosted by the hosting server 145) utilized by the user device 105 and transmit a response for a recommended action/decision to be used by the interactive application. When the interactive application calls the API, the interactive application may provide all of the relevant information that was collected about the user and the session (e.g., demographics, session duration, products viewed, etc.). As described above, the API and the manner in which the interactive application operates may be configured by the instrumentation application. However, it is noted that the information being passed from the interactive application through the API to the broker device 150 may be provided explicitly by the interactive application or provided implicitly through session variables or some similar mechanism provided by an application framework in which the interactive application is being run (e.g., a Java servlet framework may provide a capability for servlet applications to store session variables that are then carried by the session).

With an application-centric approach to incorporate predictive analytics according to the exemplary embodiments, the collection of the data that forms the basis upon which to determine the response plays an important role. The purpose of the data may be multifold. In a first example, if the goal is next best action or next best offer, the decision framework needs to collect predictor variables that predict the outcome of the interaction. In a second example, if the goal is to make a decision that leads to an optimal outcome, the decision framework again needs to collect variables that represent the outcome of the interaction. In a third example, the decision framework may need to collect variables representing the recommendations being made. In a fourth example, the interactive application may not actually use the recommendation provided by the broker device 155 such that the decision framework would need to collect the actual action used by the interactive application. In a fifth example, if a decision rule is to be based on a statistical model or classifier, the decision framework may need to collect observations that are then used to construct training sets. In a sixth example, if a decision rule is to be based on a predictive model or classifier, the decision framework may need to consume predictor variables in real time to provide a decision. It is noted that the above examples regarding the purpose of the collected data is only exemplary. Those skilled in the art will understand that there may be any number of reasons associated with collecting data and its importance for incorporating predictive analytics according to the exemplary embodiments.

When a decision point is reached by the interactive application, the predictor variables may represent a minimum number of criteria needed to be known such that a decision may be determined by the broker device 150. However, outcome variables may not be known until later in the session or not until after the session has ended. For example, the broker device may not know when a user requests to view a page for a product and that the user has purchased the product until later in the session or at a later date. Accordingly, the data may be captured and integrated at several points in the decision framework for the predictive analytics incorporation according to the exemplary embodiments. Specifically, data may be captured in the interactive application, in the broker device 150, or in a scoring framework of the scoring device 155. For example, with the e-commerce website, the broker device 155 may perform a lookup functionality to verify whether the user has exceeded a certain volume of purchases. However, it is noted that there are advantages and disadvantages associated with the different integration points for data collection. For example, if data is not required by the interactive application beyond making a decision, the data may be integrated in the broker device 150 or in the scoring device 155. On the other hand, data integrated in a scoring framework may not be available for use outside of that scoring framework. Furthermore, data may require transformation or feature extraction before being passed to a scoring framework. Thus, the broker device 150 according to the exemplary embodiments provide an optimal point for data integration. The data captured by the broker device 150 may include predictor variables, outcome variables, requests for decisions/actions, responses to the requests (e.g., as a recommendation), and actual actions taken (even after the response is received). The data captured by the broker device 150 may be stored in the data repository 160 for further analysis.

As an application-centric approach to incorporating predictive analytics, the broker device 150 only knows about the interactive applications, systems, and decision points through the requests that the broker device 150 receives. Accordingly, via the discovery application 230, the decision broker may discover the systems, the interactive applications, and the decision points associated with received requests and store the resulting metadata. The metadata may be used to configure the broker device 150 to respond in different ways to handle different decisions on behalf of the interactive applications. For example, the session metadata as received by the broker device 150 may include an identification of the user, a type of session, a session identification, a caller identification, a party identification of entities or individuals also involved in the session, a start time, a stop time, and other session metadata. The session metadata as received by the interactive application may include an identification of the application, a version of the application, a session identification, a session start time, a session stop time, and an application session count. The session metadata may be captured, for example, once per session. Furthermore, the broker device may need to discover the variables that are being provided by the interactive applications and through data integration (as performed by the discovery application 230).

As data collection only provides an initial aspect to utilizing predictive analytics, the exemplary embodiments may utilize experimentation as a component of statistical reasoning in determining responses to requests. For example, with the free shipping as an incentive example for the e-commerce website, the data alone may not provide to whom and when to offer free shipping if the website never offered free shopping or it free shipping were only offered to members of a loyalty program. Thus, to understand how free shipping makes a difference in the interaction application to optimize the experience for the user and maximize revenue for the provider, experimentation as performed by the experimentation application 235 allows for free shipping to be offered to randomly selected users, sessions, and/or interactions.

As described above, evidence based design may be used where A/B testing provide context experiments to choose between alternative designs. The experimentation with the designs associated with A/B testing may allow for a website to randomly assign users, sessions, and/or interactions to one of two possible designs. After collecting data on a sufficient number of visits, the website selects the design that results in the best outcome. The A/B testing uses a stimulus-response approach in which the website provides a stimulus (e.g., the two designs) and observes the response.

The application-centric approach according to the exemplary embodiments may also utilize the experimentation performed by the experimentation application 235. Specifically, a stimulus-response approach may also be used where additional variables or covariates are collected about the users, sessions, and/or interactions. For example, the A/B testing for website design may be expanded by further determining which design is best suited for different demographics (e.g., age, gender, locale, etc.). The broker device 150 via the experimentation application 235 may implement experiments by assigning treatments to users, sessions, and/or interactions where a treatment is a particular way of handling a request for an action/decision from an interactive application. The treatment may always return the same recommendation or return a randomized recommendation.

The treatment may also invoke a scoring engine to evaluate a predictive model. Thus, treatments may be assigned according to the user, to the session, or the interaction. For example, a given user may always receive the same treatment each visit where a random decision is made as to which users will be offered free shipping every time the user visits the website. In another example, a user may receive the same treatment throughout a given session where a random decision is made as to which session will be offered free shipping for the duration of the session. Accordingly, a user who was offered free shipping may not receive the same offer at a subsequent visit. In a further example, a user may receive different treatment for every interaction such as each product web page being viewed may or may not include free shipping. The collection of treatments and the scheme for assigning to users, sessions, and/or interactions may be embodied as an experimental design.

As will be described in further detail below, the experimental design may be used in a variety of different manners. For example, as noted above, the experimental design may be used in developing the predictive analytics or in generating the predictive model to be used. That is, there may not be a predictive model associated with the interactive application, the decision points, the associated collected data, etc. Accordingly, the scoring device 155 may not be capable of providing any relevant score when called by the broker device 150. Thus, the experimentation may provide a baseline set of data to generate the predictive model. However, it should be noted that the use of the experimentation to generate the predictive model is only exemplary. In another exemplary embodiment, the scoring device 155 may be provided a generic predictive model that is used and updated when called by the broker device 150.

In another example, as noted above, the experimental design may be used when a predictive model has been established and is being used by the scoring device 155 when called by the broker device 150. Specifically, the predictive model may be updated without using expected decisions as defined by the predictive model but instead using unexpected or random decisions. The unexpected or random decisions may reinforce/validate the predictive model or pose further questions to trigger further experimentation on the predictive model to generate a more comprehensive predictive model.

Once data has been collected for experiments performed on how users respond to different decisions/actions, the broker device 150 via the learning application 240, the implementation application 245, and the evaluation application 250 may analyze the data and perform learning (e.g., fit models, train classifiers, etc.). Since the broker device 150 has already identified the decision points and variables (via the overview analysis application 220 and the discovery application 230), the broker device 150 may utilize the experiment data to assist the analyst component to extract datasets for analysis and learning. It is noted that the experiment data collected by the broker device 150 may include more variables than the analyst may require. Thus, the analyst may select the variables of interest. The experiment data collected by the broker device 150 also tends to be semi-structured and follows a document tree structure. Therefore, the experiment data may need to be flattened and converted into a flat, record format for consumption by analytical tools. The sets of experiment data provide an input to scoring frameworks to generate scoring packages that are invoked by the broker device 150. Subsequently, scoring packages that are used by the scoring device 155 may be obtained. The broker device 150 may also associate the scoring package with the appropriate request type that is received from the interactive application. Thus, the broker device 150 may be configured to invoke the appropriate scoring package as part of a treatment that is applied in response to a request for an action/decision. To invoke the scoring package, the broker device 150 may marshal the variables required by the selected scoring package which entails a substantially similar flattening process as used when extracting the experiment data.

It is noted that the experiment data described above may be associated with the experiments such that responses to requests for actions/decisions are randomly selected with no basis to any predictive model. However, once a predictive model is available, the broker device 150 may also determine responses to requests based on the predictive model. The predicted responses may be generated in a substantially similar manner as the experiment data as the predicted responses are further associated with the session data provided by the interactive application. However, the predicted responses are further determined using the predictive model by the scoring device 155. The data resulting from the broker device 150 transmitting the predicted response to the interactive application may be embodied as predicted data. That is, the predicted data may be differentiated from the experiment data. However, the predicted data and the experiment data may be used by the broker device 150 and the scoring device 155 in maintaining and updating the predictive model.

It is again noted that the interactive application may be configured to transmit the request for an action/decision at a decision point and receive a response from the broker device 150. However, the interactive application also be configured to ultimately determine whether to use the response. That is, the interactive application may receive the predicted response or the experiment response for use with the decision point. Even so, the interactive application may forward the actual response taken to the broker device 150 afterward.

Figure 3:
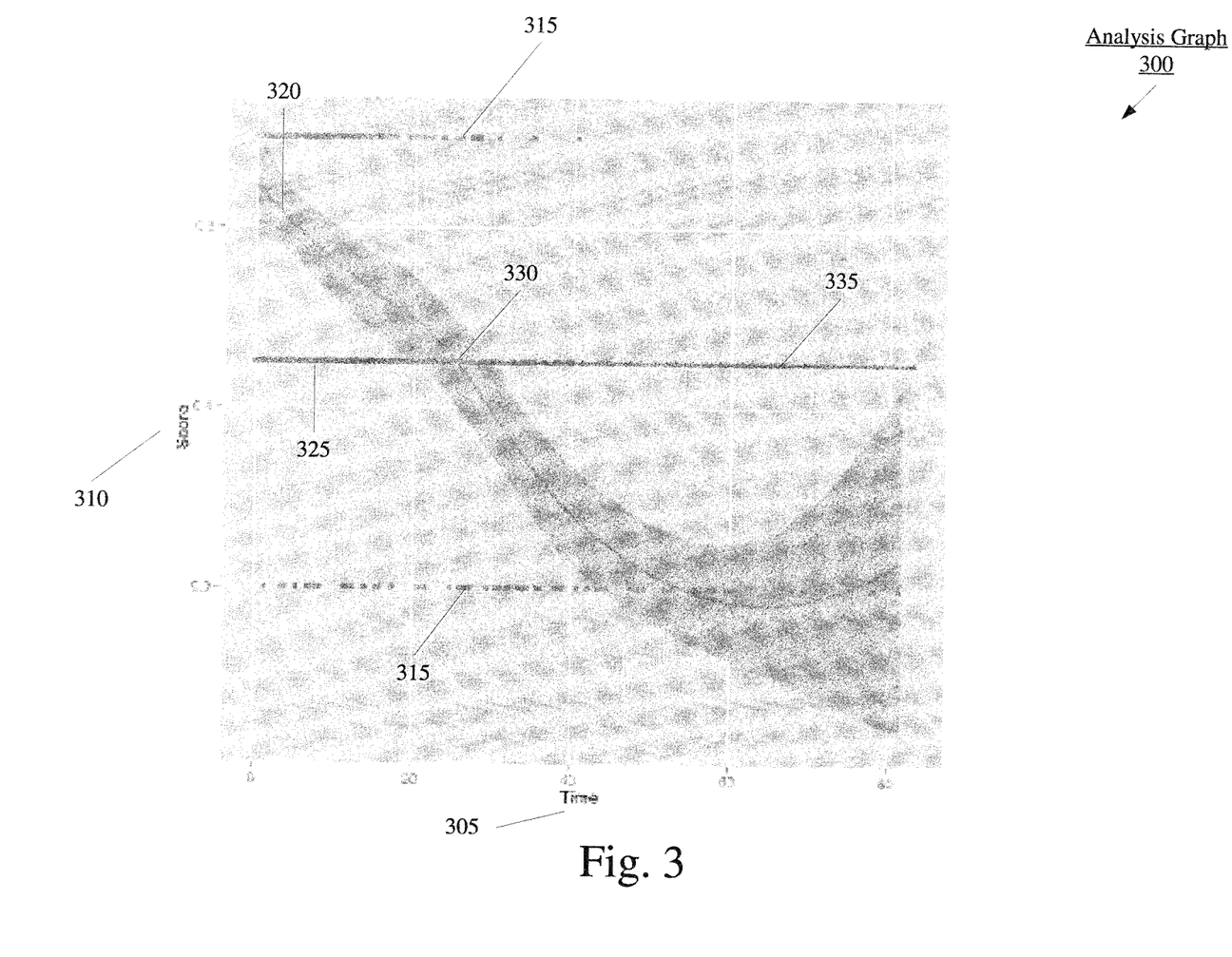
FIG. 3 shows an exemplary analysis graph used by the broker device of FIG. 2 according to the present disclosure.

FIG. 3 shows an exemplary analysis graph 300 used by the broker device 150 of FIG. 2 according to the present disclosure. The analysis graph 300 may represent how a predictive model is generated from data collected by the interactive application. As described above, the predictive model may be generated based purely on experiment data when no predictive model is available for a given request from the interactive application as defined by the session data. Thus, the analysis graph 300 may be result of performing the experiments for the request received from the interactive application. The request may be whether to offer free shipping on a purchase for a product being viewed by a user on a web page of the e-commerce website hosted by the hosting server 145. Thus, the analysis graph 300 may have defined session data associated therewith such that collected data may be combined and analyzed together accordingly.

As illustrated, the analysis graph 300 has a time axis 305 (x-axis) and a score axis 310 (y-axis). Specifically, the time axis 305 may be a duration of time that the user has been viewing the web page with the selected product. The score axis 310 may be a profit margin for the product. The analysis graph 300 further shows a first set of data points 315 and a second set of data points 325. The first set of data points 315 may represent results of when free shipping is not offered to the user while the second set of data points 325 may represent results of when free shipping is offered. As a result of collecting the first set of data points 315 and the second set of data points 325, a first curve 320 and a second curve 335, respectively, may be generated. The first curve 320 represents the score for a product being viewed at a specific time when free shipping is not offered. Accordingly, the first curve 320 represents the profit margin achieved by the provider when free shipping is not offered over a period of time. The second curve 335 represents the score for the product being viewed at a specific time when free shipping is offered. Accordingly, the second curve 335 represents the profit margin achieved by the provider when free shipping is offered over the period of time.

As can be seen, the first curve 320 intersects the second curve 335 at an intersection point 330 at time t1 and score p1. Thus, the predictive model represented by the analysis graph 300 results from the collected data regarding offering free shipping based on realized profit margin and view time of the web page. Specifically, the profit margin is greater when the product is viewed for a time less than t1 and free shipping is not offered. The profit margin is also greater when the product is viewed for a time greater than t1 and free shipping is offered.

With the predictive model being generated and prepared for use by the scoring device 155, the broker device 150 may receive a subsequent request from the interactive application at a decision point as to whether free shipping should be offered. The predictive model associated with the analysis graph 300 may correspond to this decision point. The broker device 150 may receive the session data from the interactive application. The broker device 150 may also request the session data from the interactive application. The session data may include a plurality of different types of data including a request time, an application session identification, module information (e.g., source in which the request is being made), sub-module information (e.g., class or sub-source in which the request is being made), a routine identification (e.g., the object making the request), a request label (label where the prediction was requested), a request type, an attempt number, an action list (e.g., possible actions to be recommended), weights (probabilities used if the recommended action is chosen at random), and the recommended action. In the session data, the interactive application may have included the time that has elapsed since the user has opened the web page corresponding to the product being viewed thereon. Based on the session data, the broker device 150 may determine that the predictive model associated with the analysis graph 300 corresponds to the request. Thus, the broker device 150 may call the scoring device 155 to receive the corresponding score for the elapsed time. If the elapsed time is less than the time corresponding to the intersection point 330, the scoring device 155 may return a Boolean indicating that free shipping should not be offered. If the elapsed time is greater than the time corresponding to the intersection point 330, the scoring device 155 may return a Boolean indicating that free shipping should be offered. In either case, the broker device 150 receives the value from the scoring device 155 and transmits a recommendation corresponding to the predicted response. In this manner, the broker device 150 may optimize an experience by the user using the interactive application while maximizing revenue for the provider.

It should again be noted that the above process relates to a predicted response being generated. However, the broker device 150 may determine that an experimental response should be provided. It should also be noted that the analysis graph 300 may correspond to various different types of session data. That is, the session data received from the interactive application may be used as the basis to determine whether the analysis graph 300 is appropriate with any level of detail. For example, in a more general association, the analysis graph 300 may relate to any request as to whether free shipping should be offered for any product associated with the interactive application. In another example, in a more detailed association, the analysis graph 300 may relate to a request as to whether free shipping should be offered for a specific product associated with the interactive application when the user is part of a loyalty program. In this manner, there may be a plurality of different predictive models that are configured as scoring packages that may be called by the scoring device 155 for use with determining a response by the broker device 150 to a request from the interactive application based on session data.

The exemplary embodiments provide several solutions to challenges associated with incorporating predictive analytics to responding to requests received from an interactive application at a decision point. Initially, the analyst and application developer processes are substantially decoupled and a simplified API may be used as the broker device 150 serves as an intermediary between the interactive application and the scoring device 155. The discovery application 230 may also collect predictor data automatically such that the application developer is not required to consider this aspect. In contrast to the decision-centric approach, the exemplary embodiments may provide recommendations (using any of the above listed types) instead of predictions. That is, rather than returning a probability value that a certain result will occur, a recommended action may be transmitted to the interactive application. The interactive application may also be decoupled from the recommendations that are transmitted thereto. That is, the recommendation may be determined independent of the interactive application as the session data provides the basis upon which the recommendation is determined. The calculations in determining the recommendation (e.g., via the scoring device 155) may be decoupled from the modeling operation in which a predictive model is generated and updated. As session data is collected synchronously at the time the interactive application transmits the request to the broker device 150, the data may be automatically saved to the data repository 160 for future analysis, datasets may be automatically generated for use cases for analysis, and data may be automatically collected to assess performance of the interactive application.

Figure 4:
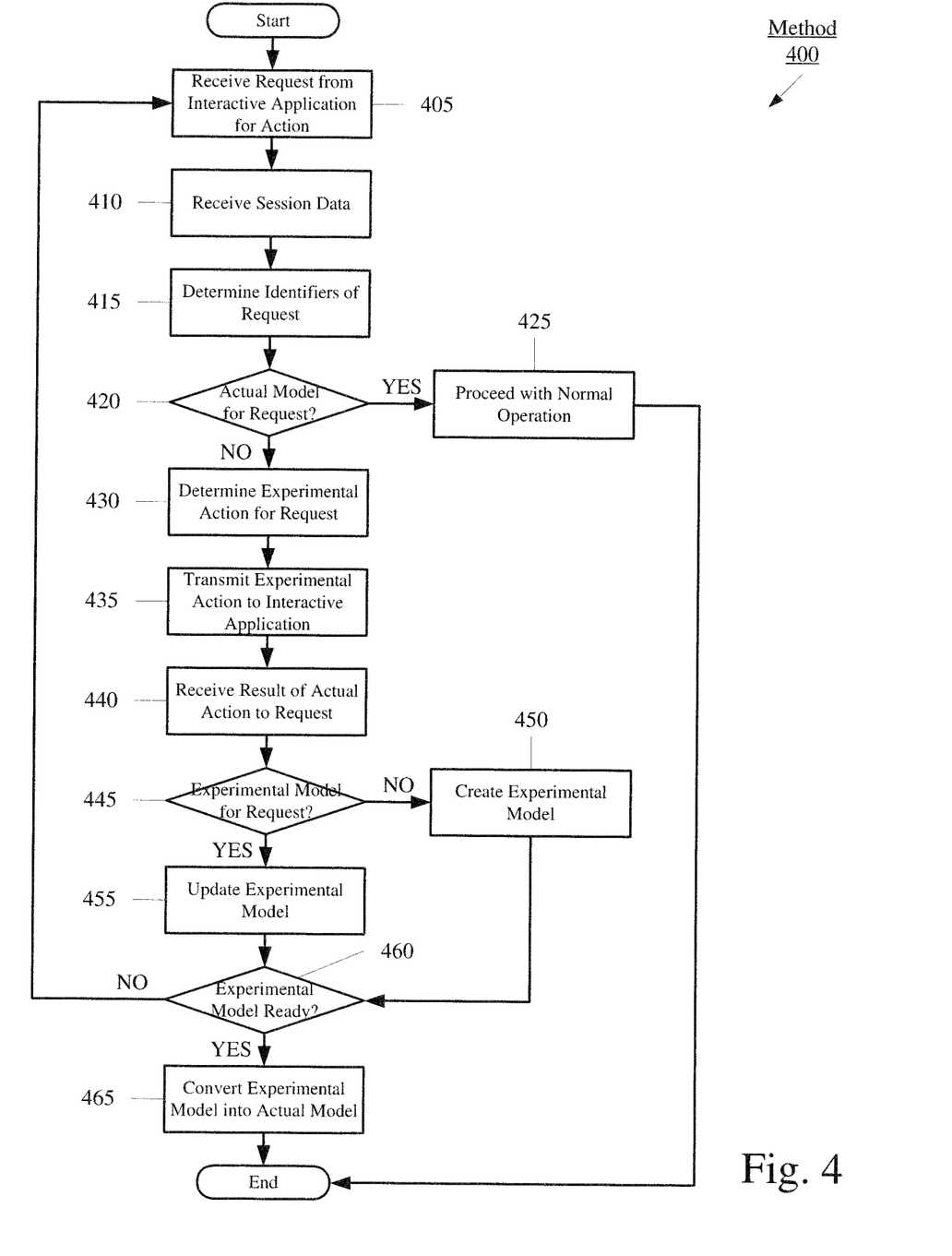
FIG. 4 shows an exemplary method performed by the broker device of FIG. 2 for generating a model according to the present disclosure.

FIG. 4 shows an exemplary embodiment of a method 400 performed by the broker device 150 for generating a predictive model according to the present disclosure. Specifically, the method 400 may relate to the operations from the perspective of the broker device 150 where communications with the interactive application as being interacted with by the user device 105 is performed. More specifically, the method 400 may relate to when no prediction model is available in responding to requests received from the interactive application. The method 400 will be described with regard to the system 100 of FIG. 1 and the broker device 150 of FIG. 2.

In step 405, the broker device 150 receives a request from the interactive application for a recommended action or decision to be used. As described above, the interactive application may be hosted by the hosting server 145. Thus, the request for the recommended action may be constructively received from the hosting server 145 through the API of the interactive application. As the interactive application is already being interacted with by the user using the user device 105, the interactive application may track where along the session the user device 105 is currently interacting. As described above, the interactive application may have decision points programmed therein where the decision point marks a time when the interactive application considers an action to be performed and thus requests a recommended action from the broker device 150.

In step 410, the broker device 150 receives (or requests) the session data from the interactive application (e.g., through the API of the interactive application). As described above, the instrumentation application 225 may have configured the interactive application to collect session data as the interactive application interacts with the user through the user device 105. In step 415, the broker device 150 via the discovery application 230 may determine identifiers associated with the request based on the session data. The identifiers may indicate a predictive model to be used to respond to the request.

In step 420, the broker device 150 determines if there is a predictive model available for the determined request. Specifically, the broker device 150 determines if a prepared, actual predictive model is available to be used by the scoring device 155 as a scoring package if called upon by the broker device 150. If an actual predictive model is available, the broker device 150 continues the method 400 to step 425 where normal operation to determine a predicted response to the request is provided. The steps for the normal operation will be described in further detail below with regard to FIG. 5.

If an actual predictive model is unavailable, the broker device 150 continues the method 400 to step 430. In step 430, the broker device 155 determines an experimental action for the request. Specifically, the experimentation application 235 may determine an experimental action to be used as a data point in determining a predictive model for the request. The experimental action may be randomly selected and associated with the request but unassociated with any previous known or collected data regarding how the request was handled.

In step 435, the broker device 150 transmits the experimental action to the interactive application (via the API of the interactive application). Upon receiving the experimental action, the interactive application may be configured to select to use the recommended action or perform a different independent action. However, this is only exemplary and the interactive application may be programmed to execute any action as received from the broker device 150. After the interactive application has performed the action, in step 440, the broker device 150 receives a result of using the actual action for the request, the actual action being whichever decision was actually used with the user.

In step 445, the broker device 150 determines whether an experimental predictive model for the request is available. The experimental predictive model may be a preliminary stage of the actual predictive model. That is, the experimental predictive model may be insufficient or unprepared for actual use with incoming requests. If there is no experimental predictive model as the request is the first of its kind (with the associated session data), the broker device 150 continues the method 400 to step 450 where an experimental predictive model is created. However, if there is an experimental predictive model for the request, the broker device 150 continues the method 400 to step 455 where the experimental predictive model is updated with the new data.

In step 460, the broker device 150 determines whether the experimental predictive model is prepared for actual use. The broker device 150 may have a business rule associated with converting experimental predictive models to actual predictive models. For example, a minimum number of data points must first be gathered and incorporated into generating the predictive model. Thus, when the minimum number of data points has been reached, the experimental predictive model may be ready. If further data points are required, the broker device 150 returns the method to step 405 for further requests to be handled. However, if the experimental predictive model is ready, the broker device 150 continues the method 400 to step 465 where the experimental predictive model is converted to an actual predictive model.

It should again be noted that the use of the experimentation to generate the predictive model is only exemplary. As described above, a generic predictive model or initial predictive model may be incorporated with the scoring device 155. The generic predictive model may be any standard estimate of how actions have an associated score as determined by the scoring device 155. The initial predictive model may be any predetermined model such as using data points of a different entity having substantially similar parameters and operations as the current interactive application.

Figure 5:
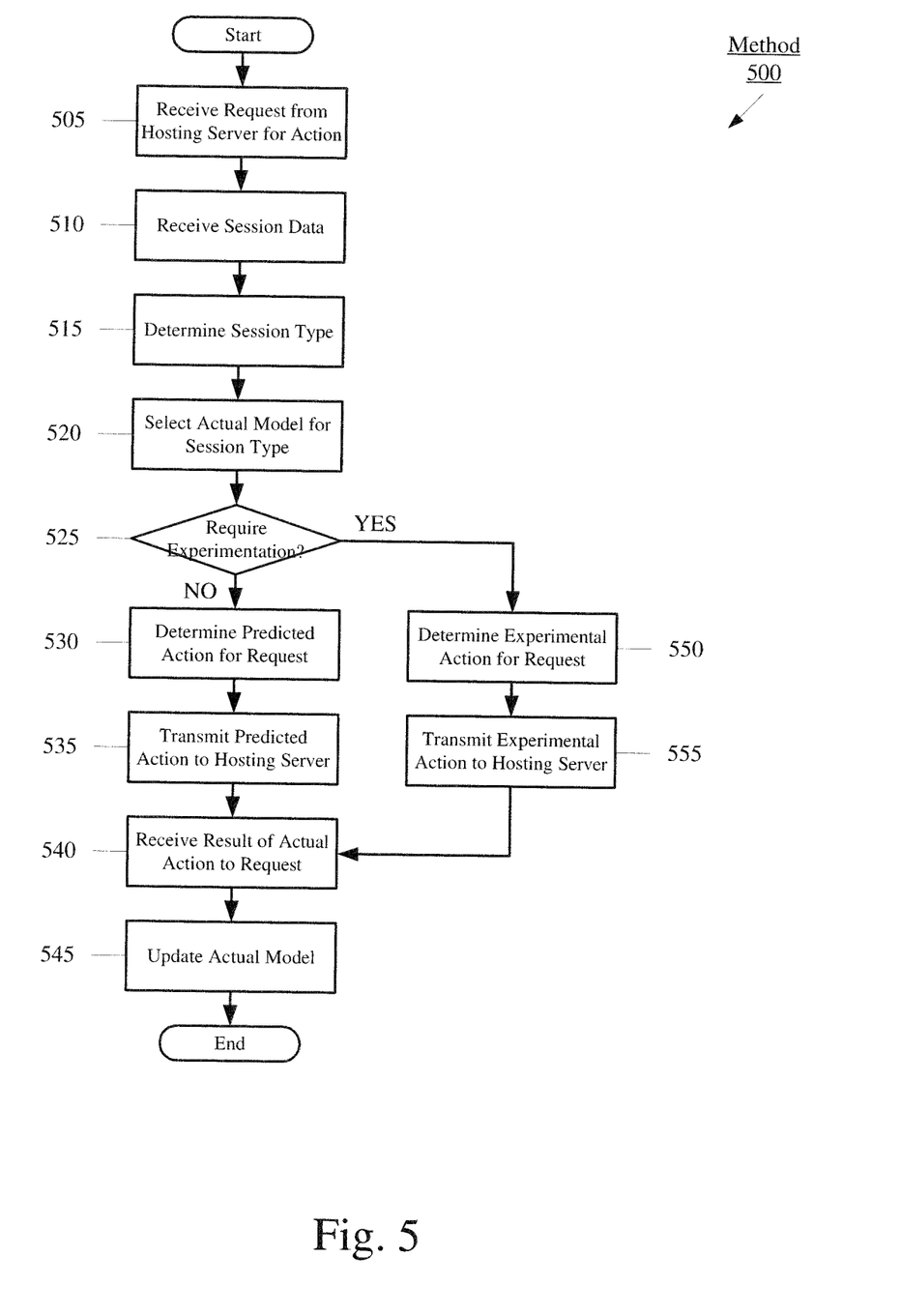
FIG. 5 shows an exemplary method performed by the broker device of FIG. 2 for utilizing a model according to the present disclosure.

FIG. 5 shows an exemplary embodiment of a method 500 performed by the broker device 150 for utilizing a predictive model according to the present disclosure. Specifically, the method 500 may relate to the operations from the perspective of the broker device 150 where communications with the interactive application as being interacted with by the user device 105 is performed. More specifically, the method 500 may relate to when a prediction model is available in responding to requests received from the interactive application. The method 500 will be described with regard to the system 100 of FIG. 1 and the broker device 150 of FIG. 2.

Initially, it is noted that the initial steps of the method 500 may be substantially similar to the initial steps of the method 400. In step 505, the broker device 150 receives a request from the interactive application for a recommended action or decision to be used at the decision point. In step 510, the broker device 150 receives or requests the session data from the interactive application. In step 515, the broker device 150 determines identifiers associated with the request.

As the method 500 relates to a time when the actual predictive model for the request is available, in step 520, the broker device 150 determines the actual predictive model corresponding to responding to the request. As previously described, the session data including various types of data and metadata may provide the basis upon which to select the actual predictive model (stored and used as scoring packages by the scoring device 155). Thus, when the broker device 150 has determined which predictive model to use, the broker device 150 may call the scoring device 155.

In step 525, the broker device 150 may determine whether the actual predictive model requires further experimentation. As described above, the experimentation may be used to generate the actual predictive model, particularly when no actual predictive model is available for the request. However, the experimentation may also be used for further purposes when the actual predictive model is available. Specifically, the experimentation may validate whether the actual predictive model is configured to generate predicted responses that are expected to provide the most optimal resolution to the response. If the experimentation leads to less optimal resolution, the broker device 150 may determine that the actual predictive model may require further tuning (e.g., by running further experiment responses). The experimentation on the actual predictive model may be performed at a variety of times. For example, the experimentation may be performed at predetermined time intervals, at random time intervals, when a general trend or shift away from the predictive model is determined, etc.

If the broker device 150 determines that predicted responses are to be used, the broker device 150 continues the method 500 to step 530. In step 530, the broker device 150 determines the predicted response based upon the actual predicted model corresponding to the request. In step 535, the broker device 150 (via the API of the interactive application) transmits the predicted action as a recommendation to the interactive application. In contrast, if the broker device 150 determines that experiment responses are to be used, the broker device 150 continues the method 500 to step 550. In step 550, the broker device 150 determines the experiment response based upon randomly selected responses. In step 555, the broker device 150 transmits the experiment response as a recommendation to the interactive application.

In step 540, the broker device 150 may receive the result of the actual action that was taken for the request by the interactive application. That is, the broker device 150 may discover the actual action and the result corresponding to using the actual action in resolving the request. The actual action may be the recommended action (e.g., predicted or experiment) or may be an independently determined action by the interactive application. Subsequently, in step 545, the actual predictive model may be updated as new data is available with respect thereto.

The exemplary embodiments provide a device, system, and method of incorporating predictive analytics with an interactive application. Specifically, the predictive analytics are incorporated in an application-centric approach in which the interactive application is programmed with decision points such that the interactive application determines when a request for a recommended action or decision is to be transmitted to a broker device, the broker device operating in conjunction with a scoring device having a plurality of scoring packages, each scoring packaging having an associated model (e.g., predictive). The broker device may provide session data received from the interactive application to the scoring device such that a value is returned to the broker device which converts the value to a response for the interactive application for the request. Experimentation may provide a basis upon which the scoring packages are created and/or updated.

With modern interactive applications, business decisions need to be made in real time such that a broker device determining recommended actions or decisions need to be lightweight and horizontally scalable with low latency. In addition, interactive applications typically do not simply engage in isolated interactions with a user. Instead, each iteration (which corresponds to a single invocation of an event handler upon an input from the user being received on the interactive application) is part of a larger session that may encompass multiple applications. For example, in a single session with an e-commerce site, the user may view several web pages for products, each time invoking a handler for a page request, place a product in their shopping cart (another handler), check the status of existing orders, go to checkout, etc. In this context, the notion of an application is vague and arbitrary since the entire website may be viewed either as one interactive application or as a collection of applications. The applications may be written in a single language and be hosted on a single hardware/software platform or the application may be written in several different languages and be distributed across several platforms. In contrast, the notion of a session is usually precise since sessions may be managed precisely by the environment in which the application is running. Thus, the exemplary embodiments considered the notion of a system as an entity that encompasses user sessions within which applications run. With business enterprises concerned with providing a unified customer experience taking into account everything that has happened to the user in a current session. Therefore, the broker device should track an entire user session and not simply individual decision requests, as is the case with decision-centric approaches. This includes tracking the beginning and the end of the session, keeping track of the application from which each decision request is made. Furthermore, the broker device should attempt to track the time a user spends in a particular application.

Through the above mechanism according to the exemplary embodiments, the application-centric approach provides several advantages. In a first example, the exemplary embodiments enable applications to focus on incorporating decisions into its logic without worrying about how the decisions are made. In a second example, the exemplary embodiments focus the analyst on making decisions that are relevant to the application and based on session data that is available at the time the decision is made. In a third example, the exemplary embodiments move decisions out of the application logic such that systems become more agile and robust (e.g., a decision about whether to grant a loan that is to be consumed by an online loan application may be easily modified to include additional business rules without changing the loan application itself) or the decision logic may be changed in response to changing business goals (e.g., the goals of the business may shift from maximizing revenues to maximizing profits or to increasing customer satisfaction).

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a mobile device having an operating system such as iOS, Android, etc. In a further example, the exemplary embodiments of the above described method may be embodied as a computer program product containing lines of code stored on a computer readable storage medium that may be executed on a processor or microprocessor. The storage medium may be, for example, a local or remote data repository compatible or formatted for use with the above noted operating systems using any storage operation. Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method, comprising:
receiving, by a broker device, a request for action data from an interactive application interacting with a user utilizing a user device, the action data indicative of an action to be taken by the interactive application during a session with the user device, the request generated by the interactive application based on a decision point associated with the interactive application;
receiving, by the broker device, session data from the interactive application, the session data associated with the session and the user device;
determining, by the broker device, scoring package data associated with the request based on the session data, the scoring package data comprising a predictive model indicative of a plurality of actions to be performed by the interactive application;
generating, by the broker device, the action data based on the scoring package data; and
transmitting, by the broker device, the action data to the interactive application.

2. The method of claim 1, further comprising:
determining, by the broker device, whether a validating operation is to be performed on the predictive model, the validating operation utilizing a randomly generated experiment response to the request;
generating, by the broker device, the experiment response for the request, the experiment response replacing the action data; and
transmitting, by the broker device, the experiment response to the interactive application.

3. The method of claim 2, wherein the validating operation is performed at a predetermined time interval, at a random time interval, or when a changing trend is determined relative to the predictive model.

4. The method of claim 1, further comprising:
prior to receiving the request, generating the scoring package data by:
receiving, by the broker device, a further request for further action data from a further interactive application interacting with a further user utilizing a further user device during a further session;
receiving, by the broker device, further session data from the further interactive application, the further session data associated with the further session and the further user device;
determining, by the broker device, experiment data as a function of the further session data, the experiment data corresponding to a randomly generated action data for the further session;
transmitting, by the broker device, the experiment data to the further user device;
receiving, by the broker device, response data from the further user device, the response data being indicative of a user response to the experiment data,
wherein the scoring package data is generated based on the response data.

5. The method of claim 4, further comprising:
receiving, by the broker device, additional further requests for additional further action data from additional further interactive applications interactive with additional further users utilizing additional further user devices;
receiving, by the broker device, additional further session data from the additional further interactive applications, the additional further session data associated with the additional further sessions and the additional further user devices;
determining, by the broker device, further experiment data as a function of the additional further session data, the further experiment data corresponding to a further randomly generated action data for the additional further sessions;
transmitting, by the broker device, the further experiment data to the additional further user devices;
receiving, by the broker device, further response data from the additional further user devices, the further response data being indicative of a further user response to the further experiment data,
wherein the scoring package data is further generated based on the further response data.

6. The method of claim 5, wherein the scoring package data is generated when a predetermined minimum number is reached from a sum of the further request and a number of the additional further requests.

7. The method of claim 1, further comprising:
receiving, by the broker device, response data from the interactive application indicating actual action data that was used, the actual action data being indicative of a user response to the actual response data being used.

8. The method of claim 7, further comprising:
updating, by the broker device, the predictive model and the scoring package data based on the response data.

9. The method of claim 7, wherein the actual action data is the action data or an independent response generated by the interactive application.

10. The method of claim 1, further comprising:
generating, by the broker device, a data request for the session data; and
transmitting, by the broker device, the data request to the interactive application,
wherein the receiving the session data is in response to the data request.

11. A broker device, comprising:
a transceiver configured to communicate with a scoring device and an interactive application, the interactive application interacting with a user utilizing a user device;
a memory arrangement; and a processor coupled to the transceiver and the memory arrangement, wherein the processor is configured to instruct the transceiver to receive a request for action data from the interactive application, the action data indicative of an action to be taken by the interactive application during a session with the user device, the request generated by the interactive application based on a decision point associated with the interactive application, wherein the processor is configured to instruct the transceiver to receive the session data from the interactive application, the session data associated with the session and the user device, wherein the processor is configured to determine scoring package data associated with the request based on the session data, the scoring package data comprising a predictive model indicative of a plurality of actions to be performed by the interactive application, wherein the processor is configured to generate the action data based on the scoring package data.

12. The broker device of claim 11, wherein the processor is further configured to determine whether a validating operation is to be performed on the predictive model, the validating operation utilizing a randomly generated experiment response to the request, wherein the processor is further configured to generate the experiment response for the request, the experiment response replacing the action data, wherein the processor is further configured to instruct the transceiver to transmit the experiment response to the interactive application.

13. The broker device of claim 12, wherein the validating operation is performed at a predetermined time interval, at a random time interval, or when a changing trend is determined relative to the predictive model.

14. The broker device of claim 11, wherein, prior to receiving the request, the processor is configured to generate the scoring package data, wherein the processor is further configured to instruct the transceiver to receive a further request for further action data from a further interactive application interacting with a further user utilizing a further user device during a further session, wherein the processor is further configured to instruct the transceiver to receive further session data from the further interactive application, the further session data associated with the further session and the further user device, wherein the processor is further configured to determine experiment data as a function of the further session data, the experiment data corresponding to a randomly generated action data for the further session, wherein the processor is further configured to instruct the transceiver to transmit the experiment data to the further user device, wherein the processor is further configured to instruct the transceiver to receive response data from the further user device, the response data being indicative of a user response to the experiment data, wherein the scoring package data is generated based on the response data.

15. The broker device of claim 14, wherein the processor is further configured to instruct the transceiver to receive additional further requests for additional further action data from additional further interactive applications interactive with additional further users utilizing additional further user devices, wherein the processor is further configured to instruct the transceiver to receive additional further session data from the additional further interactive applications, the additional further session data associated with the additional further sessions and the additional further user devices, wherein the processor is further configured to determine further experiment data as a function of the additional further session data, the further experiment data corresponding to a further randomly generated action data for the additional further sessions, wherein the processor is further configured to instruct the transceiver to transmit the further experiment data to the additional further user devices, wherein the processor is further configured to instruct the transceiver to receive further response data from the additional further user devices, the further response data being indicative of a further user response to the further experiment data, wherein the scoring package data is further generated based on the further response data.

16. The broker device of claim 15, wherein the scoring package data is generated when a predetermined minimum number is reached from a sum of the further request and a number of the additional further requests.

17. The broker device of claim 11, wherein the processor is further configured to instruct the transceiver to transmit the predicted response to the interactive application, wherein the processor is further configured to instruct the transceiver to receive response data from the interactive application indicating actual action data that was used, the actual action data being indicative of a user response to the actual response data being used.

18. The broker device of claim 17, wherein the processor is further configured to update the predictive model and the scoring package data based on the response data.

19. The broker device of claim 17, wherein the actual action data is the action data or an independent response generated by the interactive application.

20. The broker device of claim 11, wherein the processor is further configured to generate a data request for the session data, wherein the processor is further configured to instruct the transceiver to transmit the data request to the interactive application, wherein the receiving the session data is in response to the data request.

* * * * *